UNITED STATES PATENT OFFICE 2,411,153

MINERAL OIL COMPOSITION AND IMPROVING AGENT

Everett W. Fuller and Henry G. Berger, Woodbury, and Robert H. Williams, Merchantville, N. J., assignors to Socony-Vacuum Oil Company, Incorporated, a corporation of New York No Drawing. Application February 29, 1944, Serial No. 524,490

6 Claims. (Cl. 252—46.7)

This invention has to do with the stabilization of petroleum products against the harmful effects of oxidation and deterioration with use. More specifically, it has to do with the improvement or stabilization of mineral oil fractions, particularly viscous mineral oils, by the use of novel reaction products, or a novel class of reaction products, which when admixed with a mineral oil in minor proportions will prevent or delay undesirable changes taking place in the oil.

It is well known to those familiar with the art that substantially all of the various fractions obtained from mineral oils and refined for their various uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the deleterious products formed in an oil fraction as a result of oxidation and the degree to which they are formed depends upon the extent to which the various unstable constituents, which may act as oxidation catalysts, have been removed by refining operations, and also upon the conditions of use.

In recent years a great many materials containing one or more characterizing chemical elements have been proposed for use as fortifying or stabilizing agents for petroleum products. Materials containing sulfur, phosphorus, halogen or metals, or combinations of one or more such elements, have been credited with improving petroleum products in certain respects. For example, various phosphorus- and sulfur-containing materials such as reaction products of various organic substances and the several phosphorus sulfides have been proposed for this purpose.

This invention relates to phosphorus- and sulfur-containing reaction products possessed of the capacity to effect improvement of mineral oil fractions. More specifically, the present invention is predicated upon the discovery of an outstanding and novel group of oil-soluble, phosphorus- and sulfur-containing reaction products obtained by reaction of substantially one mol of $P_2S_5$ and four mols of oleyl alcohol at a temperature between about 125° C. and about 150° C., and preferably at about 150° C.

These reaction products are particularly effective as additives for mineral oils. They are characterized by relatively low acidity and high degree of heat stability. They are different in chemical and physical properties from related materials prepared under different conditions and are superior to the latter as petroleum oil additives.

As contemplated herein, both technically pure and commercial grades of oleyl alcohol may be reacted with $P_2S_5$ under the above-mentioned reaction conditions in order to obtain the desired products. Inasmuch as commercial oleyl alcohol or "ocenol" is available in large quantities and is relatively inexpensive it is preferred herein.

It is well known that aliphatic alcohols will react with $P_2S_5$ under moderate temperature conditions to give products that consist principally of the corresponding dialkyl dithiophosphoric acids. In the case of oleyl alcohol this reaction may be expressed by the following equation:

$$4C_{18}H_{35}OH + P_2S_5 \rightarrow 2(C_{18}H_{35}O)PSSH + H_2S$$

The sulfur and phosphorus analysis and the acidity (N. N. value) of the products thus formed at 50-60° C. check fairly well with the above formula. The dialkyl dithiophosphates have been proposed as addition agents for petrolum oils. However, the products prepared by reacting oleyl alcohol and $P_2S_5$ in this way are not entirely satisfactory for this purpose because of their high acidity, their tendency to evolve $H_2S$, their corrosive action with copper, and their general instability when used in petroleum oils.

Also when oleyl alcohol and $P_2S_5$ are reacted at somewhat higher temperatures, that is at about 100° C., products of a somewhat lower acidity are obtained although this value is still higher than is desirable for materials that are to be added to petroleum oils. The stability of these products prepared at about 100° C. is also unsatisfactory.

We have found, however, that when the above reaction is carried out at temperatures from about 125° C. to about 150° C. the products are much less acidic in character and are substantially more stable than those described above. Although the acidity is much lower, these products have approximately the same phosphorus and sulfur contents as the dioleyl dithiophosphoric acids prepared at lower temperatures. Using an oleyl alcohol with a bromine number of 43 a reaction product was obtained at 95° C. with a bromine number of 39.6, which checks fairly well with a calculated value of 38 for a dioleyl dithiophosphoric acid prepared from this oleyl alcohol. When this same oleyl alcohol was reacted with $P_2S_5$ at 150° C., the resulting product had a bromine number of only 19.4. The above properties together with an increase in viscosity for the material made at 125° to 150° C. indicate a difference in chemical structure for these new reaction products.

We have also found that when oleyl alcohol and $P_2S_5$ are reacted at temperatures much above 150° C., further less desirable changes take place. At higher temperatures the product becomes cloudy and an insoluble sludge separates which may contain a considerable proportion of the phosphorus present. The solubility of the reaction products in petroleum oils becomes less and in general these materials are not as satisfactory as those prepared at 125° to 150° C.

Two other factors influence the quality of the reaction product prepared at 125° to 150° C. In the first place, the time of reaction is important. This should be long enough to permit complete reaction to take place between the oleyl alcohol and the $P_2S_5$ and to give a product with a maximum acidity (N. N. value) of about 25. However, too long heating will result in a cloudy product or even in the deposition of an insoluble sludge containing a part of the phosphorus. The reactants should not be heated beyond the time of incipient clouding to obtain the most satisfactory products. We have found that 6 hours heating at 125° C. or 2 hours heating at 150° C., with the quantities used in the examples provided hereinbelow, gives satisfactory results. In general, then, the reaction time may be described as a "relatively short time." Another factor that should be controlled is the molar ratio of the oleyl alcohol and the $P_2S_5$. We have found that the phosphorus and sulfur containing reaction products prepared from substantially one mol of $P_2S_5$ and four mols of oleyl alcohol, or ocenol, are best suited for use in mineral oils. However, this ratio may be varied slightly without detracting from the value of the final products. In general, a molar excess of $P_2S_5$ not greater than about 25 per cent of the 1 to 4 ratio may be used. When too large an excess of $P_2S_5$ is used, the reaction products are undesirable. For example when $P_2S_5$ and oleyl alcohol were reacted in a molar ratio of 1 to 2 at 125° to 150° C. semi-solid mixtures having little oil solubility were obtained.

Experimental data is presented in Table I below to illustrate some of the statements made above. The various products shown therein were prepared by reacting substantially one mol of $P_2S_5$ and four mols of ocenol with stirring at the indicated temperatures. The reaction mixtures thus obtained were then filtered through clay. As defined in Table I, a stable product is one which, when used as a 1 per cent solution in oil, does not evolve $H_2S$, corrode copper, or form a cloud in the oil when heated for 24 hours at 100° C.

Table I

| Reaction | | Composition of product | | | Appearance | Stability |
|---|---|---|---|---|---|---|
| Temp. | Time | Percent P | Percent S | N. N. | | |
| °C. | | | | | | |
| 50–60 | 6 | 4.81 | 10.2 | 78 | Clear | Unstable. |
| 95 | 2½ | 4.68 | 9.9 | 53 | do | Do. |
| 125 | 6 | 4.64 | 9.8 | 21 | do | Stable. |
| 150 | 2 | 4.54 | 9.8 | 15 | do | Do. |
| 150 | 5 | 3.72 | 9.9 | 6 | Cloudy | Fairly stable. |
| 175 | 2 | 3.22 | 10.1 | 4 | Precipitate | Do. |

The reaction products of oleyl alcohol and $P_2S_5$ prepared at 125° to 150° C. are superior not only to related products prepared at lower and at higher temperatures from these same reactants but they are also superior to corresponding products prepared from the long chain saturated alcohols and $P_2S_5$ at temperatures within the range of 125–150° C. Thus the reaction products of one mol of $P_2S_5$ with four mols of such alcohols as stearyl alcohol and lauryl alcohol at 150° C. are highly acidic in nature when heated for the time specified for preparing our oleyl alcohol-$P_2S_5$ products, and if heated for a prolonged period of time decomposition sets in accompanied by the formation of insoluble sludge and an appreciable loss of phosphorus and sulfur. This is illustrated by the results shown in Table II. The products were prepared by reacting one mol of $P_2S_5$ with four mols of the alcohol at 150° C. for the time indicated and then filtering the reaction mixtures through clay.

Table II

| Alcohol | Time | Percent P | Percent S | N. N. | Remarks |
|---|---|---|---|---|---|
| Oleyl | 2 | 4.54 | 9.8 | 15 | Clear product. |
| Stearyl | 2 | 5.55 | 9.7 | 67 | Do. |
| Do | 6 | | | 49 | Slightly cloudy. |
| Do | 9 | 2.76 | 9.4 | 10 | Resinous deposit. |
| Lauryl | 3 | 6.69 | 12.95 | 91 | Clear product. |
| Do | 7 | 4.54 | 10.4 | 19 | Resinous deposit. |

To summarize the above statements, we have found that by reacting approximately one mol of $P_2S_5$ with four mols of oleyl alcohol for a few hours at temperatures from about 125° C. to about 150° C. products are formed which are exceptionably suitable as mineral oil additives. These products are superior to those obtained by reacting the same ingredients at lower or at higher temperatures and in different mol ratios, and are also superior to the reaction products of other long chain alkyl alcohols with $P_2S_5$ under the same conditions of temperature, time and molar ratio.

The effectiveness of the novel reaction products contemplated herein in mineral oils is demonstrated by the following test results.

*Corrosion inhibition*

Motor oils, especially those refined by certain solvent-extraction methods, tend to oxidize when submitted to high temperatures and to form products that are corrosive to metal bearings, such as those having the corrosion-susceptibility of cadmium-silver alloys; and may cause their failure within a comparatively short time. The following test was used to determine the corrosive action of motor oil on an automobile connecting rod bearing.

The oil used consisted of Pennsylvania neutral and residuum stocks separately refined by means of chlorex and then blended to give an S. A. E. 20 motor oil with a specific gravity of 0.872, a flash point of 435° F., and a Saybolt universal viscosity of 318 seconds at 100° F. The oil was tested by adding a section of a bearing containing a cadmium-silver alloy surface, weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing agent was run at the same time as a sample of the straight oil, and the loss in weight of the bearing section in the inhibited oil can thus be compared directly with the loss of the section in the uninhibited oil. The results obtained in this test are set forth in Table III below.

Table III

| Reaction product | Per cent conc. | Mgms. loss in weight |
|---|---|---|
| None | | 25 |
| Oleyl alcohol-$P_2S_5$ at 150° C. for 2 hours | 0.10 | 5 |

Lauson engine test

To further demonstrate the effectiveness of the reaction products contemplated herein as mineral oil addition agents a blank oil and a blend of the oil and a typical reaction product were subjected to a Lauson engine test. In this test a single cylinder Lauson engine was run with an oil temperature of 290° F. and a jacket temperature of 212° F. The oil used was an S. A. E. 10 motor oil solvent refined. The neutralization number (N. N.) and viscosity in centistokes at 210° F. of the oil and oil blend were determined after 36 hours. The results are set forth in Table IV below.

Table IV

| Reaction product | Per cent conc. | N. N. | K. V. @ 210° F. |
|---|---|---|---|
| None | | 5.1 | 7.45 |
| Oleyl alcohol-$P_2S_5$ at 150° C. for 2 hours | 1.0 | 1.0 | 6.04 |

Ring sticking and sludge inhibition

That the reaction products contemplated herein are particularly effective in decreasing the tendency of petroleum lubricating oils to cause ring-sticking and sludge deposition during the operation of internal combustion engines is demonstrated by the results given below in Table V. This is clearly shown by results of the following test which involves the operation of a single cylinder C. F. R. engine at a speed of 1200 R. P. M. over a time interval of 28 hours. The temperature of the cooling medium of the engine was held at approximately 370° F., and the oil temperature was held at 175° F. during the test. The oil used was a lubricating oil stock of 120 seconds Saybolt Universal viscosity at 210° F., and the conditions observed at the end of the test were: (a) the extent to which the piston rings were stuck, (b) the extent to which the slots in the oil rings were filled with carbonaceous deposits in the oil, (c) the deposits formed on the piston, and (d) the acidity or neutralization number (N. N.) of the oil. The results thus obtained for the blank oil and a representative blend of the oil and a typical reaction product are set forth in Table V below:

ing use. The great effectiveness of these materials is demonstrated by the small amounts necessary to stabilize mineral oils. They may be used in varying concentrations as up to about 5 per cent depending upon the type of oil, the conditions under which the blend is to be used, etc. In general, however, concentrations from about ½ per cent to about 2 per cent of these reaction products will be sufficient to effect substantial improvement of the oil. These new reaction products may be used either in straight mineral oils or in oils containing additives that have been added for other purposes, such as detergents, pour point depressant, viscosity index improvers, etc.; in which case, these serve to stabilize the resulting blends without detracting from the effectiveness of one or more of the said additives.

It is apparent from the foregoing that the reaction products prepared at temperatures from 125° C. to about 150° C. are unlike those previously known in the art. Therefore, they are contemplated herein as new compositions of matter.

It is to be understood that while we have hereinabove described certain typical procedures for making the novel phosphorus- and sulfur-containing reaction products contemplated herein and have referred to certain specific reaction products and specific mineral oils the invention is not limited to these specific features but includes variations which will be apparent to those skilled in the art and which come within the scope of the appended claims.

We claim:

1. An improved mineral oil composition comprising a viscous mineral oil and in admixture therewith a minor proportion, from about 0.1 per cent to about 5 per cent, of an oil-soluble, phosphorus- and sulfur-containing reaction product obtained by reaction of substantially one mol of phosphorus pentasulfide and four mols of oleyl alcohol at a temperature from about 125° C. to about 150° C., the reaction time-reaction temperature relationship being so maintained that the acidity of said reaction product is not greater than about 25.

2. An improved mineral oil composition comprising a viscous mineral oil and in admixture therewith a minor proportion, from about 0.1 per cent to about 5 per cent, of an oil-soluble, phosphorus- and sulfur-containing reaction product obtained by reaction of substantially one mol of phosphorus pentasulfide and four mols of oleyl alcohol at 150° C. for about two hours.

3. An improved mineral oil composition comprising a viscous mineral oil and in admixture therewith a minor proportion, from about 0.1 per cent to about 5 per cent, of an oil-soluble, phosphorus- and sulfur-containing reaction product obtained by reaction of substantially one mol of

Table V

| Reaction product | Per cent conc. | Ring condition degrees stuck | | | | | Slots per cent filled | | | Deposits | N. N. |
|---|---|---|---|---|---|---|---|---|---|---|---|
| | | 1 | 2 | 3 | 4 | 5 | 3 | 4 | 5 | | |
| None | | 360 | 360 | 360 | 360 | 360 | 70 | 90 | 80 | 14.9 | 2.0 |
| Oleyl alcohol-$P_2S_5$ product at 150° C. for 2 hours | 1.0 | 0 | 0 | 0 | 0 | 0 | 0 | 0 | 0 | 4.5 | 1.1 |

The results given in the foregoing tables (III through V) indicate that the novel reaction products contemplated herein prevent the corrosion of hard metal bearings, inhibit the development of acids, prevent the increase in viscosity and formation of gumming deposits in engines during use.

phosphorus pentasulfide and four mols of oleyl alcohol at a temperature from about 125° C. to about 150° C., the reaction time-reaction temperature relationship being so maintained as to minimize cloud formation in said reaction product.

4. As a new composition of matter, an oil-soluble, phosphorus- and sulfur-containing reaction product obtained by reaction of substantially one mol of phosphorus pentasulfide and four mols of oleyl alcohol at a temperature from about 125° C. to about 150° C., the reaction time-reaction temperature relationship being so maintained that the acidity of said reaction product is not greater than about 25.

5. As a new composition of matter, an oil-soluble, phosphorus- and sulfur-containing reaction product obtained by reaction of substantially one mol of phosphorus pentasulfide and four mols of oleyl alcohol at 150° C. for about two hours.

6. As a new composition of matter, an oil-soluble, phosphorus- and sulfur-containing reaction product obtained by reaction of substantially one mol of phosphorus pentasulfide and four mols of oleyl alcohol at a temperature from about 125° C. to about 150° C., the reaction time-reaction temperature relationship being so maintained as to minimize cloud formation in said reaction product.

EVERETT W. FULLER.
HENRY G. BERGER.
ROBERT H. WILLIAMS.